United States Patent
Kobayashi et al.

(10) Patent No.: US 9,527,166 B2
(45) Date of Patent: *Dec. 27, 2016

(54) WELDING PORTION INSPECTION DEVICE AND INSPECTION METHOD THEREFORE, WITH EXTRACTING PORTION FOR EXTRACTING EVAPORATION LUMINESCENCE AND THERMAL RADIATION

(71) Applicant: TOYOTA JIDOSHA KABUSHIKI KAISHA, Toyota-shi, Aichi-ken (JP)

(72) Inventors: Hiroomi Kobayashi, Okazaki (JP); Masashi Furukawa, Toyota (JP); Keisuke Uchida, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/784,493

(22) PCT Filed: Apr. 11, 2014

(86) PCT No.: PCT/IB2014/000539
§ 371 (c)(1),
(2) Date: Oct. 14, 2015

(87) PCT Pub. No.: WO2014/170735
PCT Pub. Date: Oct. 23, 2014

(65) Prior Publication Data
US 2016/0067832 A1    Mar. 10, 2016

(30) Foreign Application Priority Data

Apr. 15, 2013 (JP) ................. 2013-085150

(51) Int. Cl.
*G01N 21/00* (2006.01)
*B23K 31/12* (2006.01)
(Continued)

(52) U.S. Cl.
CPC ............. *B23K 31/125* (2013.01); *B23K 26/03* (2013.01); *B23K 26/032* (2013.01); *B23K 26/21* (2015.10); *B23K 26/24* (2013.01)

(58) Field of Classification Search
CPC   G01N 21/9501; G01N 21/94; G01N 21/8806; G01N 21/956; G01N 21/95607
See application file for complete search history.

(56) References Cited

U.S. PATENT DOCUMENTS

| 4,572,941 A | 2/1986 | Sciaky et al. |
| 5,651,903 A * | 7/1997 | Shirk .................. B23K 26/034 219/121.63 |

(Continued)

FOREIGN PATENT DOCUMENTS

| EP | 2543464 A2 | 1/2013 |
| JP | 03-080596 B2 | 12/1991 |

(Continued)

*Primary Examiner* — Tarifur Chowdhury
*Assistant Examiner* — Md M Rahman
(74) *Attorney, Agent, or Firm* — Sughrue Mion, PLLC

(57) ABSTRACT

A welding portion inspection method includes: irradiating welding laser beam along welding trajectories set in works plural times or irradiating inspection laser beam along scanning trajectories set in a molten pool of the works which is melted by the welding laser beam plural times; receiving return light including reflected light from the molten pool of the work, evaporation luminescence generated due to evaporating of the work and thermal radiation light radiated from the molten pool of the work; extracting short wavelength component containing evaporation luminescence and long wavelength component containing thermal radiation light from the return light and inspecting the welding condition of (Continued)

the welding portion of the work based on a ratio between an intensity of the short wavelength component and an intensity of the long wavelength component.

6 Claims, 18 Drawing Sheets

(51) Int. Cl.
  *B23K 26/03* (2006.01)
  *B23K 26/24* (2014.01)

(56) References Cited

U.S. PATENT DOCUMENTS

| | | | |
|---|---|---|---|
| 6,937,329 B2* | 8/2005 | Esmiller | B23K 1/0056 219/121.63 |
| 2002/0158053 A1* | 10/2002 | Kessler | B23K 26/034 219/121.83 |
| 2010/0282722 A1 | 11/2010 | Ramsayer et al. | |
| 2011/0215074 A1* | 9/2011 | Wang | B23K 9/091 219/121.64 |

FOREIGN PATENT DOCUMENTS

| | | |
|---|---|---|
| JP | 11-010335 A | 1/1999 |
| JP | 2000-225481 A | 8/2000 |
| JP | 2004-066266 A | 3/2004 |
| JP | 2007-098442 A | 4/2007 |
| JP | 2008-087056 A | 4/2008 |
| JP | 2008-272767 A | 11/2008 |
| JP | 2010-533071 A | 10/2010 |
| JP | 2014-195814 A | 10/2014 |
| JP | 2014-195822 A | 10/2014 |
| JP | 2014-198345 A | 10/2014 |
| WO | 2014/155188 A1 | 10/2014 |
| WO | 2014/155190 A2 | 10/2014 |
| WO | 2014/155191 A2 | 10/2014 |

* cited by examiner

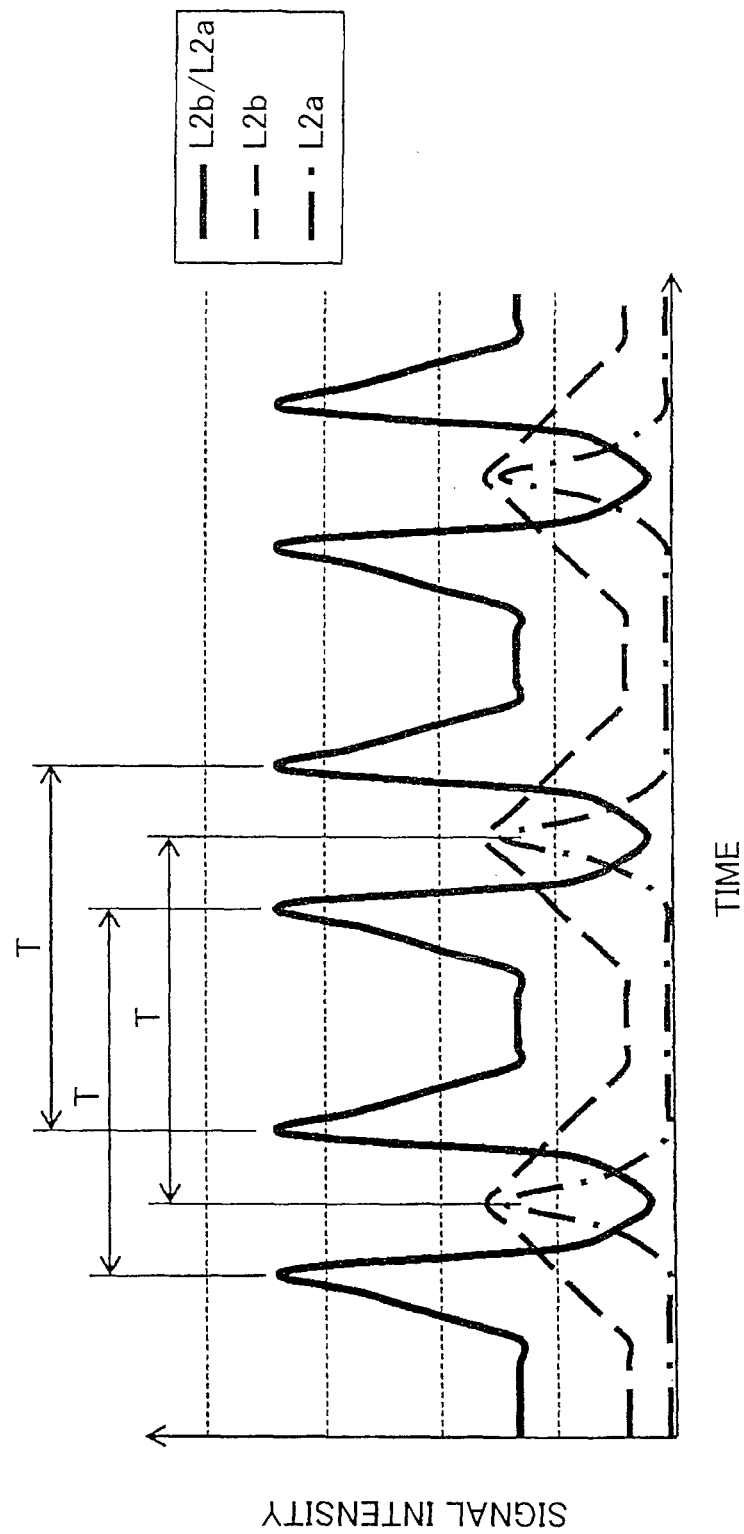

WELDING PORTION INSPECTION DEVICE AND INSPECTION METHOD THEREFORE, WITH EXTRACTING PORTION FOR EXTRACTING EVAPORATION LUMINESCENCE AND THERMAL RADIATION

BACKGROUND OF THE INVENTION

1. Field of the Invention

The present invention relates to a welding portion inspection device and an inspection method therefor, particularly to an inspection device which inspects a welding condition of a welding portion formed when a plurality of works are welded together by means of laser beam and an inspection method therefor, for example.

2. Description of Related Art

When two steel sheets are welded together by means of laser beam such that they are stacked one upon another, the quality evaluation of a welding portion formed by laser welding has been performed. As an example of the quality evaluation on the welding portion formed by laser beam, for example, Japanese Patent Application Publication No. 2008-87056 (JP 2008-87056 A) has disclosed a technology concerning the quality evaluation on the laser welding using reflected light of the laser beam.

A laser welding quality determination system disclosed in JP 2008-87056 A radiates YAG laser, for example, from a laser torch. A laser reflected light is received by a first reflected light receiving/outputting device from a forward-diagonally upward side in the advance direction of welding operation. Further, a welding light including evaporative light (plume) and reflected laser light is received by a second reflected light receiving/outputting device coaxially with the radiation direction of laser beam. The laser reflected light and welding light received from two predetermined directions at the same time are converted to an electric signal corresponding to their intensities. As a result, this system determines the welding quality based on the signal intensity of this electric signal or changes thereof.

According to the laser welding quality determination system disclosed in JP 2008-87056 A, the reflected laser light and the welding light are received from two different directions at the same time. The signal intensity of each of the received lights is compared with a threshold set appropriately. As a result, it is possible to determine that any one of various welding defects such as underfill in which welding bead sinks to fill a gap between steel sheets, joint failure in which upper and lower steel sheets fail to joint due to an excessive gap between the steel sheets, bead depression in which bead is depressed due to an excessive gap between steel sheets, fusing in which bead vanishes abruptly due to a change in thermal balance, boring has occurred.

However, according to the laser welding quality determination system disclosed in JP 2008-87056 A, for example, if a laser torch and a work (steel sheet) are set apart from each other, the electric signal obtained from the received reflected laser beam or welding light may be very weak. Thus, the accuracy for determination of welding failure may drop. Particularly, in the case of bead depression in which bead is depressed upon laser welding, the change in electric signal due to the welding failure decreases. Thus, sometimes, any welding failure in a work cannot be detected precisely. Further, evaporation luminescence generated due to melting/evaporating of a work or thermal radiation light radiated from a molten pool in the work changes depending on a work temperature. It has been known that a threshold for determining the electric signal obtained from the received reflected laser beam or welding light and the laser welding quality changes depending on the work temperature. If the change in the work temperature upon laser welding is large, the determination accuracy for the work welding defect sometimes may further drop.

SUMMARY OF THE INVENTION

The present invention provides a welding portion inspection device capable of inspecting a welding condition of a welding portion in a work precisely in a remote welding operation for welding with a laser torch and the work set apart from each other, for example, and an inspection method therefor.

A first aspect of the present invention relates to a welding portion inspection device configured to inspect a welding condition of a welding portion formed when a plurality of works are welded together. The welding portion inspection device includes: an irradiation portion configured to irradiate welding laser beam along a welding trajectory set in works plural times or irradiate inspection laser beam plural times along a scanning trajectory set in a molten pool of the work melted by the welding laser beam so as to weld together the works; a light receiving portion configured to receive return light including reflected light from the molten pool in the work by the welding laser beam or the inspection laser beam irradiated by the irradiation portion, evaporation luminescence which is generated by evaporating of the work and thermal radiation light radiated from the molten pool in the work; an extracting portion configured to extract a first component containing evaporation luminescence and a second component containing thermal radiation light from return light received by the light receiving portion; and an inspecting portion configured to inspect the welding condition of the welding portion of the work based on a ratio between an intensity of the first component and an intensity of the second component which are extracted by the extracting portion.

If, when a welding defect exits in the welding portion of the work, the welding laser beam irradiated along the welding trajectory set in the work or the inspection laser beam irradiated along the scanning trajectory set in the molten pool of the work passes over the welding defect, the intensity of the first component containing evaporation luminescence and the intensity of the second component containing thermal radiation light of the return light change at substantially the same cycle but the waveforms of the intensities are different. Thus, when the ratio between the intensity of the first component and the intensity of the second component is calculated, it comes that a plurality of waveforms which change at substantially the same cycle but have a phase shift exist together. It is considered that the periodic change of the period T originating from the welding defect of the welding portion of the works is amplified.

According to the above-described aspect, by extracting the first component containing evaporation luminescence and the second component containing thermal radiation light from the return light received by the light receiving portion when irradiating the welding laser beam along the welding trajectory plural times or irradiating the inspection laser beam along the scanning trajectory plural times, the welding condition of the welding portion of the work is inspected based on the ratio between the intensity of the first component and the intensity of the second component. As a result, even if the electric signal obtained from the return light received by the light receiving portion is weak or the intensity of the return light received by the light receiving portion changes depending on changes in work temperature in a remote welding operation for welding with an irradiation portion and the work set apart from each other, for example, the periodic change originated from the welding defect of the welding portion of the work can be detected securely by amplifying, so that the welding condition of the welding portion of the work can be inspected precisely.

Further, in the above-described aspect, the inspecting portion may inspect the welding condition of the welding portion of the work by conducting Fourier transform on the ratio between the intensity of the first component and the intensity of the second component or a power of the ratio between the intensity of the first component and the intensity of the second component.

According to the above-described aspect, the inspecting portion inspects the welding condition of the welding portion of the work by conducting Fourier transform on the ratio between the intensity of the first component and the intensity of the second component or a power of the ratio between the intensity of the first component and the intensity of the second component. As a result, the periodic change originated from the welding defect of the welding portion of the work can be detected more securely. Thus, the welding condition of the welding portion of the work can be inspected more precisely.

Further, in the above-described aspect, the inspecting portion may inspect the welding condition of the welding portion of the work based on an amplitude under a frequency that is plural times as high as a fundamental frequency detected by conducting Fourier transform on a ratio between the intensity of the first component and the intensity of the second component or the power of the ratio between the intensity of the first component and the intensity of the second component.

According to the above-described aspect, the inspecting portion inspect the welding condition of the welding portion of the work based on the amplitude under a frequency plural times the fundamental frequency detected by conducting Fourier transform on the ratio between the intensity of the first component and the intensity of the second component or the power of the ratio between the intensity of the first component and the intensity of the second component. As a result, the welding condition of the welding portion of the work can be inspected more precisely.

Further, in the above-described aspect, the extracting portion may spectrally disperse the return light received by the light receiving portion to at least the first component containing evaporation luminescence and the second component containing thermal radiation light and extract the first component containing evaporation luminescence and the second component containing thermal radiation light from the return light.

According to the above-described aspect, the extracting portion at least spectrally disperses the return light received by the light receiving portion to the first component containing evaporation luminescence and the second component containing thermal radiation light and extracts the first component containing evaporation luminescence and the second component containing thermal radiation light from the return light. As a result, with a simple structure, the first component containing evaporation luminescence and the second component containing thermal radiation light can be extracted from the return light.

Further, a second aspect of the present invention relates to a welding portion inspection method adapted to inspect a welding condition of a welding portion formed when a plurality of works are welded together. The welding portion inspection method includes: irradiating welding laser beam along a welding trajectory set in works plural times or irradiating inspection laser beam along a scanning trajectory set in a molten pool of the work melted by the welding laser beam plural times so as to weld together the works; receiving return light including reflected light from the molten pool in the work by the welding laser beam or the inspection laser beam, evaporation luminescence which is generated by evaporating of the work and thermal radiation light radiated from the molten pool in the work; extracting a first component containing evaporation luminescence and a second component containing thermal radiation light from return light; and inspecting the welding condition of the welding portion of the work based on the ratio between an intensity of the first component and an intensity of the second component.

According to the above-described aspect, the first component containing evaporation luminescence and the second component containing thermal radiation light are extracted from the return light and the welding condition of the welding portion of the work is inspected based on the ratio between the intensity of the first component containing evaporation luminescence and the second component containing thermal radiation light. As a result, even if the electric signal obtained from the return light received by the light receiving portion is weak or the intensity of the return light received by the light receiving portion changes depending on changes in work temperature in a remote welding operation for welding with an irradiation portion and the work set apart from each other, for example, the periodic change originated from the welding defect of the welding portion of the work can be detected securely by amplifying, so that the welding condition of the welding portion of the work can be inspected precisely.

As understood from the above description, according to the first and second aspects of the present invention, when welding together a plurality of works, the first component containing evaporation luminescence and the second component containing thermal radiation light are extracted from the return light when irradiating the welding laser beam along the welding trajectory plural times or irradiating the inspection laser beam along the scanning trajectory plural times, and the welding condition of the welding portion of the work is inspected based on the ratio between the intensity of the first component and the intensity of the second component. As a result, even if the electric signal obtained from the return light is weak or the intensity of the return light changes depending on changes in work temperature, the welding condition of the welding portion of the work can be inspected precisely.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a diagram showing, when the welding condition of a welding portion is defective, the intensity of short wavelength component containing evaporation luminescence, the intensity of long wavelength component containing thermal radiation light and a ratio of the intensity of the long wavelength component with respect to the intensity of the short wavelength component in time series;

DETAILED DESCRIPTION OF EMBODIMENTS

As a result of energetic researches, the inventors of the present invention have found out that of the return light received when irradiating the welding laser beam and the inspection laser beam to the work, a ratio in intensity between a first component containing evaporation luminescence and a second component containing thermal radiation light is closely related to a welding condition of a welding portion formed on the work.

In addition, the inventors have found that the amplitude under a frequency that is multiple times as high as the fundamental frequency is more closely related to the welding condition of welding portion of the work than the amplitude under the fundamental frequency detected by conducting Fourier transform on a ratio between the intensity of the first component and the intensity of the second component or a power of the ratio between the intensity of the first component and the intensity of the second component.

Hereinafter, embodiments of the welding portion inspection device and inspection method therefor according to the present invention will be described with reference to the accompanying drawings.

First Embodiment of a Welding Portion Inspection Device

Figure 2:
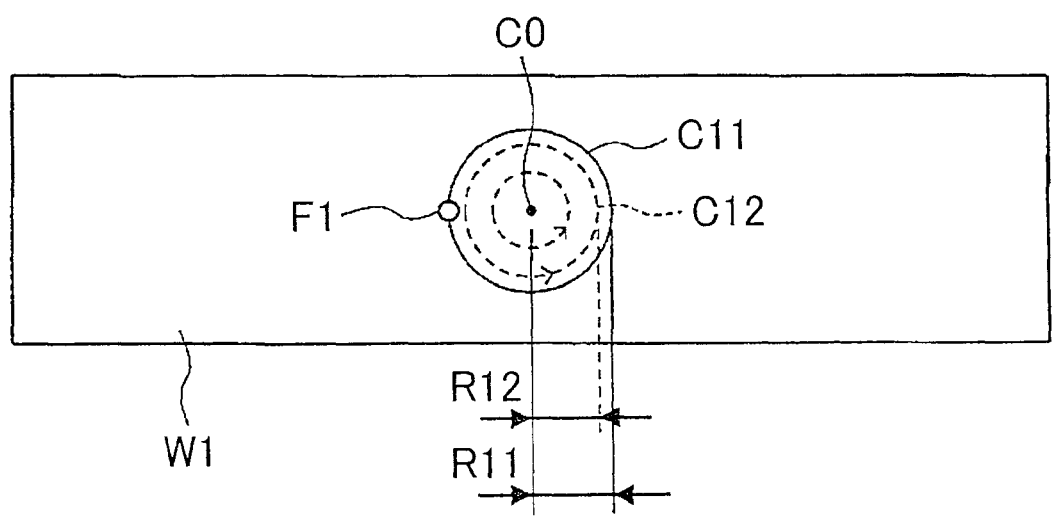
FIG. 2 is a top view describing a radiation state of welding laser beam by means of a welding irradiation portion of the inspection device shown in FIG. 1.
Figure 3:
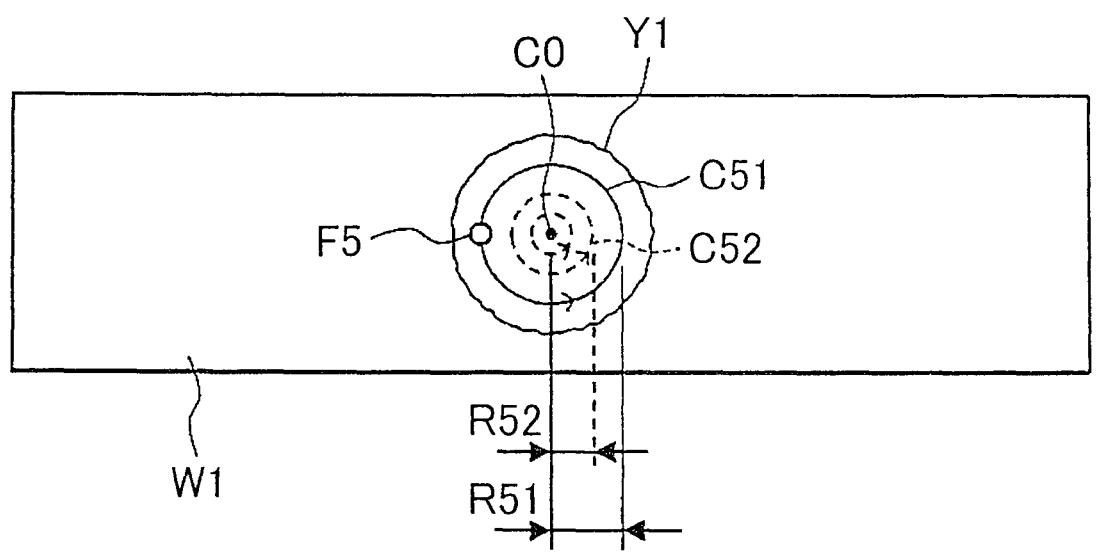
FIG. 3 is a top view describing a radiation state of inspection laser beam by means of an inspection radiation portion of the inspection device shown in FIG. 1.

First, the first embodiment of the welding portion inspection device of the present invention will be described with reference to FIGS. 1 to 3.

Figure 1:
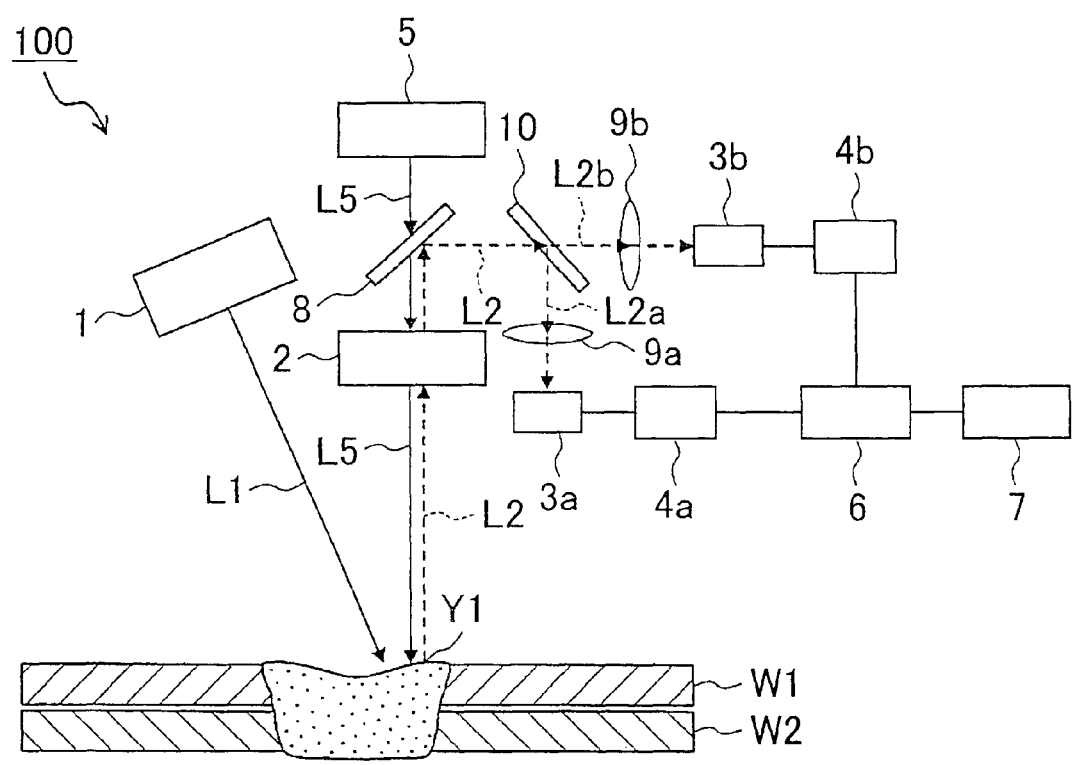
FIG. 1 is an overall configuration diagram showing an entire structure of a first embodiment of a welding portion inspection device of the present invention.

FIG. 1 is an overall configuration diagram showing an entire structure of the first embodiment of a welding portion inspection device of the present invention. FIG. 2 is a top view describing a radiation state of welding laser beam by means of a welding irradiation portion of the inspection device shown in FIG. 1, and FIG. 3 is a top view describing a radiation state of inspection laser beam by means of an inspection radiation portion of the inspection device shown in FIG. 1.

The inspection device 100 shown in FIG. 1 includes mainly a welding irradiation portion 1, an inspection irradiation portion 5, a light receiving portion 2, optical filters 8, 10, converting portions 3a, 3b, amplifiers 4a, 4b, an inspection portion 6, and an cathode ray tube (CRT) 7.

The welding irradiation portion 1 irradiates two works W1, W2 with welding laser beam (e.g., YAG laser having a predetermined laser wavelength) L1 to weld together the two works W1, W2 (e.g., steel sheet) stacked one upon another or disposed slightly apart from each other. More specifically, as shown in FIG. 2, the welding irradiation portion 1 turns a focus F1 of welding laser beam L1 along a substantially circular welding trajectory C11 having a radius R11 set on the work W1 plural times and irradiates over the welding trajectory C11 with the welding laser beam L1 plural times. Next, the focus F1 of the welding laser beam L1 is moved inside the welding trajectory C11. Subsequently, the focus F1 of the welding laser beam L1 is turned along a substantially circular welding trajectory C12 which has a smaller radius R12 than the radius R11 and is coaxial with the welding trajectory C11 plural times and irradiates the welding laser beam L1 over the welding trajectory C12 plural times. By repeating the irradiation step of the welding laser beam L1 in this way, the substantially circular welding portion is formed on the works W1, W2 so as to weld together the works W1, W2 (also called laser screw welding). In the meantime, a center C0 of the welding trajectory C11 and the welding trajectory C12 serves as a welding center of the welding portions to be formed on the works W1, W2.

By irradiation of the welding laser beam L1 by means of the welding irradiation portion 1, molten pool Y1 is formed as a result of melting of the works W1, W2 on the right and left of the welding laser beam L1 and in the back thereof with respect to an advance direction of the welding laser beam L1. In the first embodiment, the welding laser beam L1 is irradiated along the substantially circular welding trajectories C1, C2 as described above. As a result, the substantially circular molten pool Y1 is formed in the works W1, W2.

As shown in FIG. 1, the inspection irradiation portion 5 irradiates inspection laser beam L5 to the molten pool Y1 in a molten state through an optical filter 8 and a light receiving portion 2. More specifically, as shown in FIG. 3, the inspection irradiation portion 5 turns the focus F5 of the inspection laser beam L5 along a substantially circular scanning trajectory C51 having a radius R51 set inside an outer edge of the molten pool Y1 at a substantially constant speed plural times and irradiates the inspection laser beam L5 over the scanning trajectory C51 plural times. Next, the focus F5 of the inspection laser beam L5 is moved inside the scanning trajectory C51. Subsequently, the focus F5 of the inspection laser beam L5 is turned along a substantially circular scanning trajectory C52 which has a smaller radius R52 than the radius R51 and is coaxial with the scanning trajectory C51 plural times and the inspection laser beam L5 is irradiated over the scanning trajectory C52 plural times. By repeating the irradiation step of the inspection laser beam L5 in this way, the inspection irradiation portion 5 irradiates the inspection laser beam L5 over the substantially circular entire molten pool Y1 formed in the works W1, W2. In the meantime, the center of the scanning trajectories C51, C52 is set to the center C0 of the aforementioned welding trajectories C11, C12, for example.

As shown in FIG. 1, with the inspection irradiation portion 5 irradiating the inspection laser beam L5 to the molten pool Y1, the light receiving portion 2 receives return light L2 including reflected light from the molten pool Y1 of the works W1, W2 by the inspection laser beam L5, evaporation luminescence which is generated by melting/evaporating of the works W1, W2 (plasma light), and thermal radiation light (infrared light) radiated from the molten pool Y1 of the works W1, W2.

The return light L2 received by the light receiving portion 2 is spectrally dispersed to short wavelength component L2a containing evaporation luminescence (plasma light) having a wavelength of approximately 550 nm and long wavelength component L2b containing thermal radiation light (infrared light) having a wavelength of approximately 800 nm through the optical filter 8 and the optical filter (extracting portion) 10. In this way, the short wavelength component L2a and the long wavelength component L2b are extracted from the return light L2.

The converting portion 3a converts the short wavelength component L2a which has been obtained by spectrally dispersing through the optical filter 10 and condensing through a condensing lens 9a to an electric signal and outputs the electric signal to the amplifier 4a. The amplifier 4a amplifies the signal intensity of the electric signal output from the converting portion 3a and sends to the inspecting portion 6.

Further, the converting portion 3b converts the long wavelength component L2b which has been obtained by spectrally dispersing through the optical filter 10 and condensing through a condensing lens 9b outputs the electric signal to the amplifier 4b. The amplifier 4b amplifies the signal intensity of the electric signal output from the converting portion 3b and sends to the inspecting portion 6.

The inspecting portion 6 processes the electric signals which have been sent from the amplifiers 4a, 4b to inspect a welding condition of a welding portion formed on the works W1, W2. More specifically, when the inspection irradiation portion 5 irradiates the inspection laser beam L5 to the molten pool Y1 along the respective scanning trajectories C51, C52 plural times, the inspecting portion 6 calculates a ratio in signal intensity between the short wavelength component L2a containing evaporation luminescence and the long wavelength component L2b containing thermal radiation light, which are sent from the respective amplifiers 4a, 4b. The inspecting portion 6 inspects the welding condition of the welding portion formed in the works W1, W2 based on that ratio. The inspecting portion 6 sends a signal processing result of the electric signal sent from the amplifiers 4a, 4b and an arithmetic processing result obtained by the inspecting portion 6 to the CRT 7. The CRT 7 displays the signal processing result and the arithmetic processing result sent from the inspecting portion 6.

First Embodiment of Welding Portion Inspection Method

Next, the first embodiment of the welding portion inspection method of the present invention using inspection device 100 of the welding portion shown in FIG. 1 will be described with reference to FIGS. 4 to 7.

Figure 4:
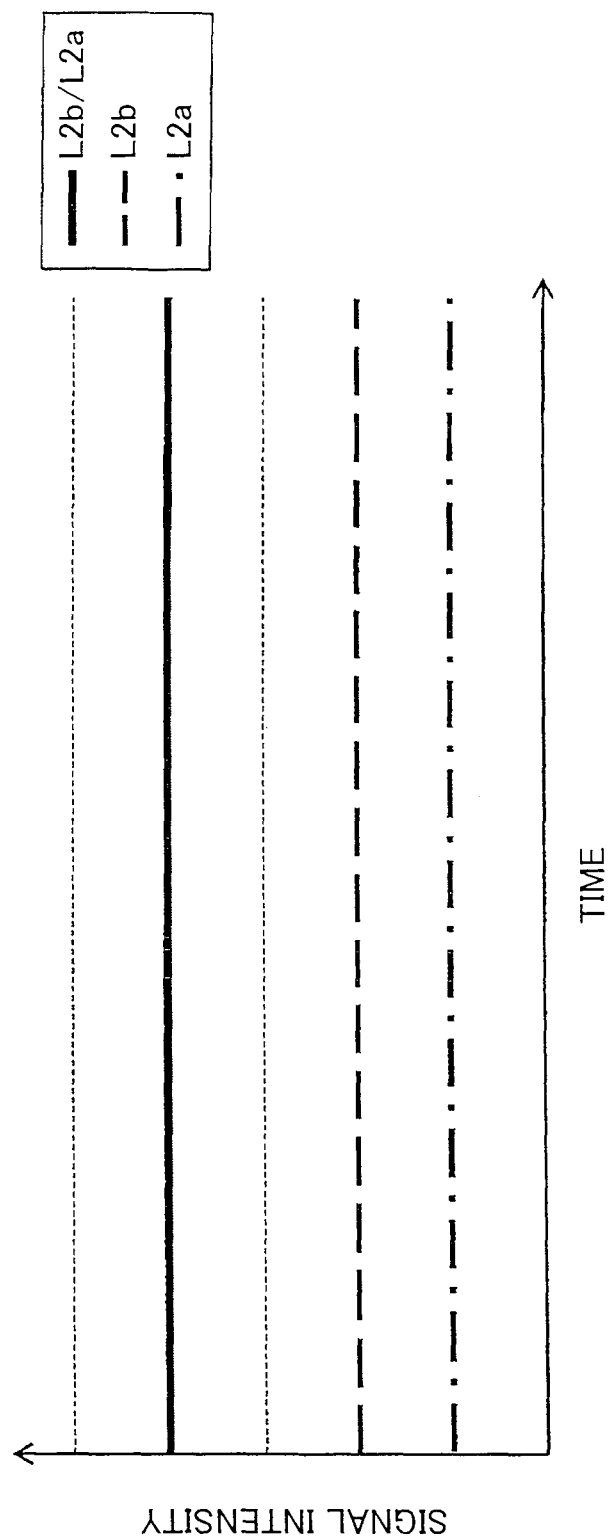
FIG. 4 is a diagram showing, when the welding condition of a welding portion is normal, the intensity of short wavelength component containing evaporation luminescence, the intensity of long wavelength component containing thermal radiation light and the ratio of the intensity of the long wavelength component with respect to the intensity of the short wavelength component in time series.
Figure 5A:
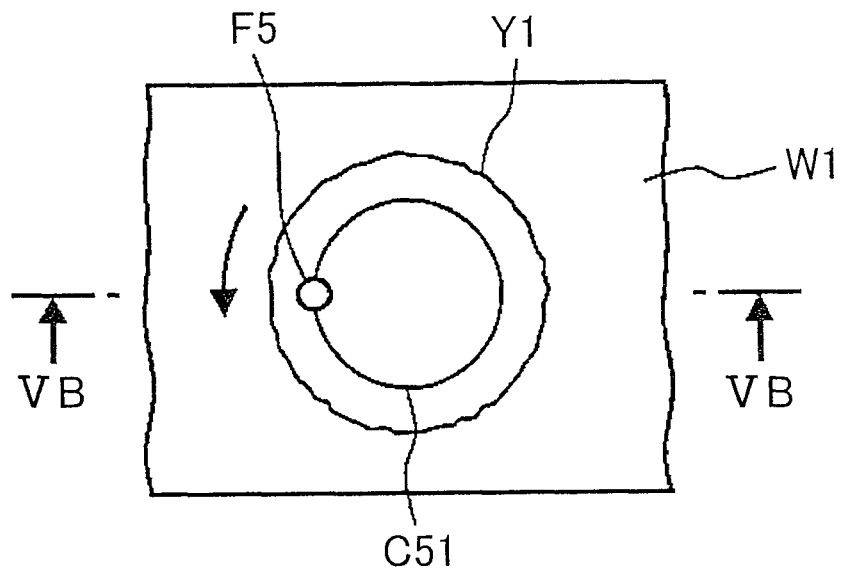
FIG. 5A is a top view describing a relationship between a molten pool and a scanning trajectory of inspection laser beam when the welding condition of a welding portion is normal.
Figure 5B:
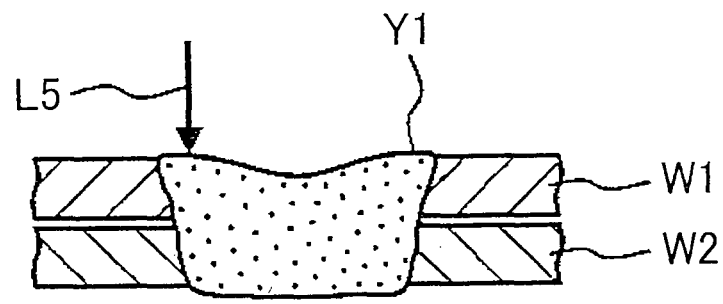
FIG. 5B is a view taken along the line VB-VB in FIG. 5A.

FIG. 4 is a diagram showing in series, when the welding condition of the welding portion is normal, the intensity of short wavelength component containing evaporation luminescence, the intensity of long wavelength component containing thermal radiation light and the ratio of the intensity of long wavelength component with respect to the intensity of the short wavelength component calculated by the inspecting portion 6, which are to be sent to the inspecting portion 6 of the inspection device 100 shown in FIG. 1. FIG. 5A is a top view describing a relationship between a molten pool and a scanning trajectory of inspection laser beam when the welding condition of the welding portion is normal. FIG. 5B is a view taken along the line VB-VB in FIG. 5A. FIG. 6 is a diagram showing in time series, when the welding condition of the welding portion is defective, the intensity of short wavelength component containing evaporation luminescence, the intensity of long wavelength component containing thermal radiation light and the ratio of the intensity of long wavelength component with respect to the intensity of the short wavelength component calculated by the inspecting portion 6, which are to be sent to the inspecting portion 6 of the inspection device 100 shown in FIG. 1.

Figure 7A:
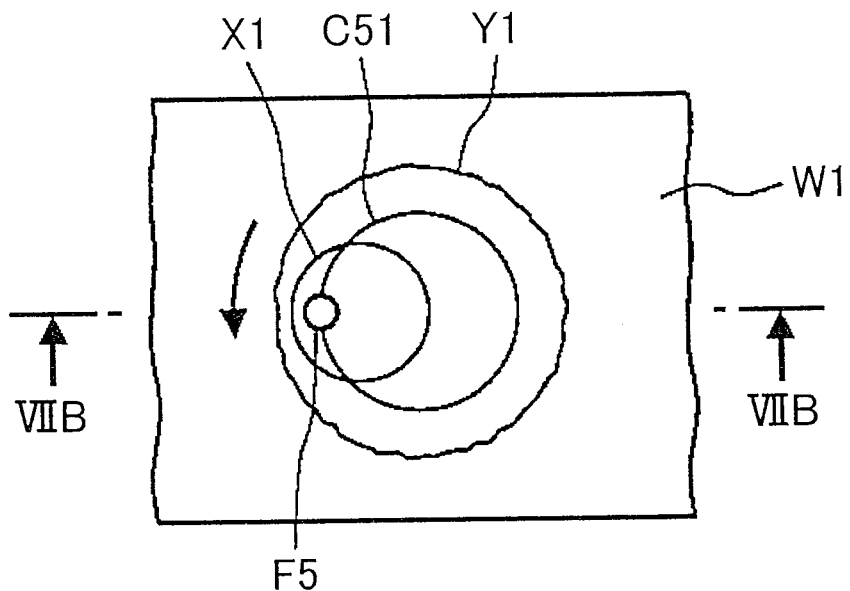
FIG. 7A is a top view describing a relationship between the molten pool and the scanning trajectory of inspection laser beam when the welding condition of the welding portion is defective.
Figure 7B:
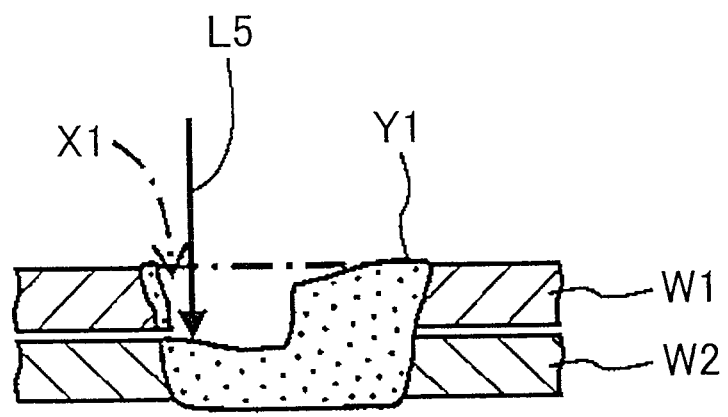
FIG. 7B is a view taken along the line VIIB-VIIB in FIG. 7A.

FIG. 7A is a top view describing a relationship between the molten pool and the scanning trajectory of inspection laser beam when the welding condition of the welding portion is defective. FIG. 7B is a view taken along the line VIIB-VIIB in FIG. 7A.

If, when the welding condition of the welding portion is normal as shown in FIG. 5A and FIG. 5B (when the works W1, W2 are normally welded together), the focus F5 of the inspection laser beam L5 is turned along the substantially circular scanning trajectory C51 set in the molten pool Y1, for example, plural times to irradiate the inspection laser beam L5 over the scanning trajectory C51 plural times, it is considered that the change in intensities of the reflected light, evaporation luminescence and thermal radiation light by the inspection laser beam L5 from the works W1, W2 is relatively small.

Thus, as shown in FIG. 4, the change in intensity of the short wavelength component L2a sent to the inspecting portion 6, the change in intensity of the long wavelength component L2b and the change in the ratio of the intensity of the long wavelength component L2b with respect to the intensity of the short wavelength component L2a obtained by the inspecting portion 6 are relatively small.

On the other hand, if, when the welding condition of the welding portion is defective as shown in FIG. 7A and FIG. 7B (for example, in the case of one side work depressed welding which is caused when welding bead on one of works is depressed), the focus F5 of the inspection laser beam L5 is turned along the substantially circular scanning trajectory C51 set in the molten pool Y1, for example, plural times to irradiate the inspection laser beam L5 over the scanning trajectory C51 plural times, and if any welding defect X1 (a part in which molten metal is missing) exits on the scanning trajectory C51 of the inspection laser beam L5, it is considered that when scanning the welding defect X1 of the scanning trajectory C51 with the inspection laser beam L5, the intensities of the reflected light, the evaporation luminescence and the thermal radiation light from the works W1, W2 by the inspection laser beam L5 decrease and the intensities of the reflected light, the evaporation luminescence and the thermal radiation light from the works W1, W2 change periodically.

Thus, as shown in FIG. 6, the intensity of the short wavelength component L2a and the intensity of the long wavelength component L2b, sent to the inspecting portion 6 change periodically by a scanning period T (for example, a period in which the inspection laser beam L5 makes a single turn along the scanning trajectory C51) of the inspection laser beam L5. Here, although the intensity of the short wavelength component L2a and the intensity of the long wavelength component L2b sent to the inspecting portion 6 change periodically by a substantially period T, their intensity wavelengths are different. Thus, in the ratio of the intensity of the long wavelength component L2b with respect to the intensity of the short wavelength component L2a obtained by the inspecting portion 6, it comes that a plurality of (e.g, two) wavelengths which change by period T and with a phase shift exist together. Thus, the periodic change of the period T originating from the welding defect X1 of the welding portion formed in the works W1, W2 is amplified.

Thus, according to the inspection method of the first embodiment, the periodicity of the ratio change of the intensity of the long wavelength component L2b with respect to the intensity of the short wavelength component L2a in this way is analyzed by the inspecting portion 6. More specifically, when irradiating the inspection laser beam L5 along the respective scanning trajectories C51, C52 plural times, the ratio of the signal intensity of the long wavelength component L2b containing thermal radiation light sent from the amplifier 4b with respect to the signal intensity of the short wavelength component L2a containing evaporation luminescence sent from the amplifier 4a is calculated. As a result, even if the electric signal obtained from the return light L2 is weak or if the intensity of the return light L2 changes depending on a change in work temperature, for example, the welding condition of the welding portion formed in the works W1, W2 can be inspected precisely. In addition, the welding condition of the welding portion formed in the works W1, W2 can be inspected more precisely than by detecting directly the periodicity of the intensity of the short wavelength component L2a sent to the inspecting portion 6 or the intensity of the long wavelength component L2b or the intensity of the return light L2 received by the light receiving portion 2, and the welding defect X1 which can exist inside the outer edge of the molten pool Y1 can be detected securely. At that time, by conducting Fourier transform on the ratio of the signal intensity of the long wavelength component L2b with respect to the signal intensity of the short wavelength component L2a, the periodicity of the ratio change can be detected more securely. As a result, the welding condition of the welding portion formed in the works W1, W2 can be inspected more precisely.

Particularly, according to the first embodiment, the inspection laser beam L5 is irradiated along the substantially circular scanning trajectory with respect to the molten pool Y1. Thus, a welding defect X1 which can exist inside the outer edge of the molten pool Y1 eccentrically from the welding center C0 or a welding defect X1 of a non-circular shape such as an elliptical shape and a substantially polygon shape can be detected.

Further, according to the first embodiment, the inspection laser beam L5 is irradiated along the scanning trajectories C51, C52 set in the molten pool Y1 formed by irradiating with the welding laser beam L1. Based on the periodicity of a change in the ratio of the signal intensity of the long wavelength component L2b with respect to the signal intensity of the short wavelength component L2a sent from the respective amplifiers 4a, 4b when irradiating the inspection laser beam L5 along the scanning trajectories C51, C52, the welding condition of the welding portion is inspected. As a result, even if irradiation condition of the welding laser beam L1 changes or the focus point of the welding laser beam deflects from a generation position of the welding defect X1, the scanning condition (scanning trajectory or scanning speed) of the inspection laser beam L5 can be adjusted appropriately. Thus, the welding condition of the welding portion formed on a work can be inspected precisely.

Second Embodiment of Welding Portion Inspection Device

Next, the second embodiment of the welding portion inspection device of the present invention will be described with reference to FIG. 8.

Figure 8:
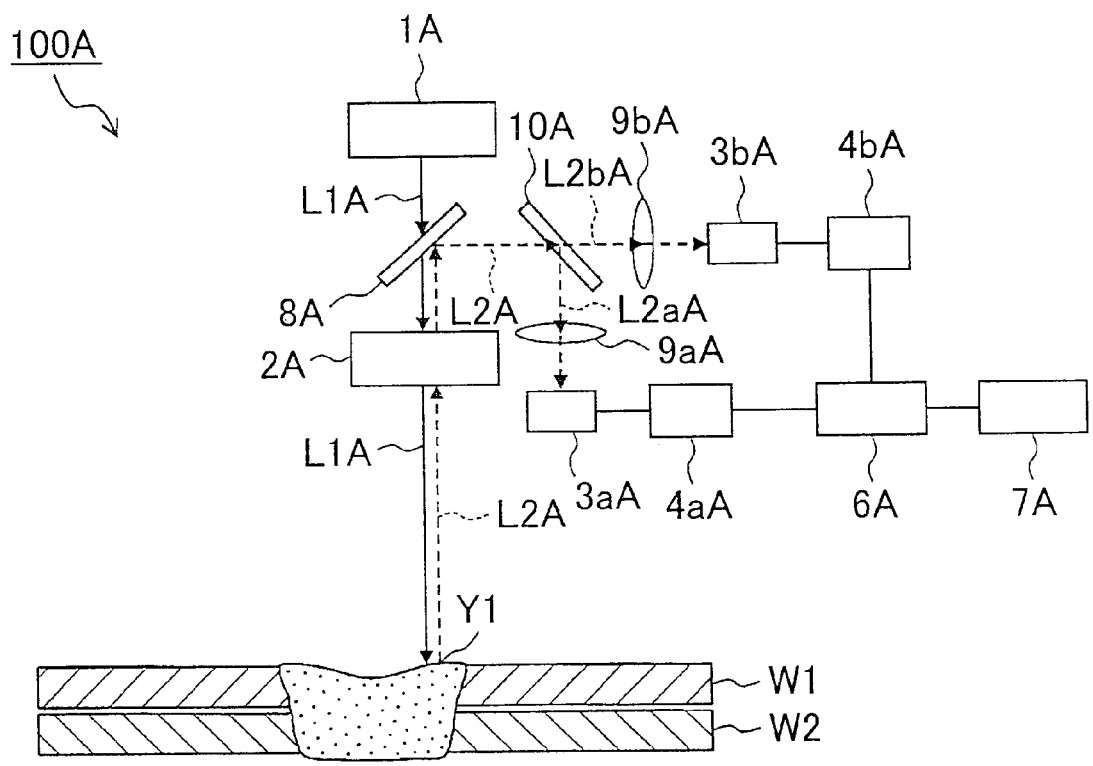
FIG. 8 is an overall configuration diagram showing the entire structure of a second embodiment of the welding portion inspection device of the present invention.

FIG. 8 is an overall configuration diagram showing the entire structure of the second embodiment of the welding portion inspection device of the present invention. The inspection device 100A of the second embodiment shown in FIG. 8 is different from the inspection device 100 of the first embodiment shown in FIG. 1 in inspecting the welding condition of the welding portion using the return light of the welding laser beam irradiated from the welding irradiation portion. Other structure is almost the same as the inspection device 100 of the first embodiment. Therefore, a detailed description of the same structure as the first embodiment is omitted while like reference numerals are attached to like components.

The inspection device 100A shown in the drawing includes mainly a welding irradiation portion 1A, a light receiving portion 2A, optical filters 8A, 10A, converting portions 3aA, 3bA, amplifiers 4aA, 4bA, an inspecting portion 6A, and a CRT 7A.

The welding irradiation portion 1A irradiates two works W1, W2 with welding laser beam L1A through an optical filter 8A and the light receiving portion 2A to weld together the two works W1, W2 stacked one upon another or disposed slightly apart from each other. By irradiation of the welding laser beam L1A by means of the welding irradiation portion 1A, molten pool Y1 is formed as a result of melting of the works W1, W2 on the right and left of the welding laser beam L1A and in the back thereof with respect to an advance direction of the welding laser beam L1A.

The light receiving portion 2A receives return light L2A including reflected light from the molten pool Y1 of the works W1, W2 by the welding laser beam L1A which is irradiated from the welding irradiation portion 1A, evaporation luminescence which is generated by melting/evaporating of the works W1, W2 (plasma light), and thermal radiation light (infrared light) radiated from the molten pool Y1 of the works W1, W2.

The return light L2A received by the light receiving portion 2A is spectrally dispersed to short wavelength component L2$a$A containing evaporation luminescence (plasma light) and long wavelength component L2$b$A containing thermal radiation light (infrared light) through the optical filter 8A and the optical filter (extracting portion) 10A. In this way, the short wavelength component L2Aa and the long wavelength component L2$b$A are extracted from the return light L2A.

The converting portion 3aA converts the short wavelength component L2$a$A which has been obtained by spectrally dispersing through the optical filter 10A and condensing through a condensing lens 9aA to an electric signal and outputs the electric signal to the amplifier 4aA. The amplifier 4aA amplifies the signal intensity of the electric signal output from the converting portion 3aA and sends to the inspecting portion 6A.

Further, the converting portion 3bA converts the long wavelength component L2$b$A which has been obtained by spectrally dispersing through the optical filter 10A and condensing through a condensing lens 9bA outputs the electric signal to the amplifier 4bA. The amplifier 4bA amplifies the signal intensity of the electric signal output from the converting portion 3bA and sends to the inspecting portion 6A.

The inspecting portion 6A processes the electric signals which have been sent from the amplifiers 4aA, 4bA to inspect the welding condition of the welding portion formed on the works W1, W2. More specifically, when the welding irradiation portion 1A irradiates the welding laser beam L1A along the welding trajectories plural times, the inspecting portion 6A calculates a ratio in signal intensity between the short wavelength component L2$a$A and the long wavelength component L2$b$A, which are sent from the respective amplifiers 4aA, 4bA. Based on this ratio, the welding condition of the welding portion formed in the works W1, W2 is inspected. The inspecting portion 6A sends a signal processing result of the electric signal sent from the amplifiers 4aA, 4bA and an arithmetic processing result obtained by the inspecting portion 6A to the CRT 7A. The CRT 7A displays the signal processing result and the arithmetic processing result sent from the inspecting portion 6A.

If the welding condition of the welding portion is normal like the first embodiment as described above, when irradiating the welding laser beam L1A along the welding trajectory, the change in intensity of the short wavelength component L2$a$A sent to the inspection portion 6A, the change in intensity of the long wavelength component L2$b$A and the change in the ratio of the intensity of the long wavelength component L2$b$A with respect to the intensity of the short wavelength component L2$a$A obtained by the inspecting portion 6A are relatively small.

On the other hand, if the welding condition of the welding portion is defective and the welding defect (a portion in which the molten metal is missing) is formed on the welding trajectory by the welding laser beam L1A, when the welding laser beam L1A is irradiated along the welding trajectory plural times, the intensity of the short wavelength component L2$a$A and the intensity of the long wavelength component L2$b$A sent to the inspecting portion 6A change periodically. Further, it comes that a plurality of (e.g., two) waveforms which change at substantially the same cycle and have shifted phases exit together in the ratio of the intensity of the long wavelength component L2$b$A with respect to the intensity of the short wavelength component L2$a$A which are obtained by the inspecting portion 6A, so that the periodic change originating from the welding defect of the welding portion formed in the works W1, W2 is amplified.

According to the second embodiment, the periodicity of the ratio change of the intensity of the long wavelength component L2$b$A with respect to the intensity of the short wavelength component L2$a$ in this way is A analyzed by the inspecting portion 6A. More specifically, when irradiating the welding laser beam L1A along the welding trajectories plural times, the ratio of the signal intensity of the long wavelength component L2$b$A containing thermal radiation light sent from the amplifier 4bA with respect to the signal intensity of the short wavelength component L2$a$A containing evaporation luminescence sent from the amplifier 4aA is calculated. As a result, even if the electric signal obtained from the return light L2A is weak or if the intensity of the return light L2A changes depending on a change in work temperature, the welding condition of the welding portion formed in the works W1, W2 can be inspected precisely. In addition, the welding condition of the welding portion formed in the works W1, W2 can be inspected more precisely than by detecting directly the periodicity of the intensity of the short wavelength component L2$a$A sent to the inspecting portion 6A or the intensity of the long wavelength component L2$b$A or the intensity of the return light L2A received by the light receiving portion 2A. Thus, the welding defect which can exist inside the outer edge of the molten pool Y1 can be detected securely.

In the above-described first embodiment, an embodiment in which the center of the scanning trajectory of the inspection laser beam is set at the center of the welding trajectory of the welding laser beam has been described. However, the center of the scanning trajectory of the inspection laser beam may be set at an appropriate position within the molten pool formed by irradiation of the welding laser beam.

Further, in the above-described first and second embodiments, an embodiment in which the welding trajectory of the welding laser beam and the scanning trajectory of the inspection laser beam are substantially circular has been described. However, the welding trajectory of the welding laser beam and the scanning trajectory of the inspection laser beam may be in a closed loop shape such as an elliptical shape, polygon shape or in a curve or straight line of a predetermined length. If a position where the welding defect of the welding portion is likely to occur can be estimated, preferably, the welding trajectory of the welding laser beam or the scanning trajectory of the inspection laser beam is set so as to pass that position.

Further, in the above-described first and second embodiments, an embodiment in which the welding laser beam or the inspection laser beam is irradiated to a work fixed at a predetermined position has been described. However, it is permissible to weld together works by laser beam by moving the works appropriately with the welding laser beam focus position or the inspection laser beam focus position fixed. Further, it is also permissible to weld together works by laser beam by moving the works and the focus position of the welding laser beam or the inspection laser beam relative to each other.

Further, in the above-described first and second embodiments, an embodiment in which the return light received by the light receiving portion is spectrally dispersed to the short wavelength component containing evaporation luminescence and the long wavelength component containing thermal radiation light through the optical filter and the short wavelength component and the long wavelength component are extracted from the return light has been described. However, it is also permissible to extract the short wavelength component with a wavelength component in a predetermined range containing the evaporation luminescence and the long wavelength component with a wavelength component in a predetermined range containing the thermal radiation light from the return light received by the light receiving portion through the optical filter which transmits a light having a wavelength component in a predetermined range, for example.

Further, in the above-described first and second embodiments, an embodiment in which the welding condition of the welding portion is inspected based on the ratio of the intensity of the long wavelength component containing thermal radiation light with respect to the intensity of the short wavelength component containing evaporation luminescence has been described because generally, the intensity of the long wavelength component containing thermal radiation light is higher than the intensity of the short wavelength component containing evaporation luminescence. However, it is also permissible to inspect the welding condition of the welding portion based on the intensity of the short wavelength component containing evaporation luminescence with respect to the intensity of the long wavelength component containing thermal radiation light, for example. Further, in order to facilitate detection of a periodic change in the ratio between the intensity of the short wavelength component containing evaporation luminescence and the intensity of the long wavelength component containing thermal radiation light, it is also permissible to calculate a power of the ratio between the intensity of the short wavelength component containing evaporation luminescence and the intensity of the long wavelength component containing thermal radiation light and then inspect the welding condition of the welding portion based on the power of the ratio.

Experiment for Evaluating a Relationship Between the Ratio of the Intensity of the Thermal Radiation Light with Respect to the Intensity of Evaporation Luminescence Based on an Inspection Sample and the Welding Condition of the Welding Portion and a Result Thereof The inventors of the present invention have produced two types of the inspection samples having a different welding condition (examples 1, 2). Intensity measurements of evaporation luminescence (plasma light) and thermal radiation light (infrared light) from each of the inspection samples have been performed. A relationship between the ratio of the intensity of thermal radiation light with respect to the intensity of evaporation luminescence and the welding condition of the welding portion has been evaluated.

Preparation Method of Inspection Sample and Measurement Method of the Intensities of Evaporation Luminescence and Thermal Radiation Light Based on the Inspection Sample First, the preparation method of the inspection sample and the measurement method of the intensities of evaporation luminescence and thermal radiation light based on the inspection sample will be described. Three works including SCGA270D-45D with a thickness of 0.7 mm, SCGA980DU-45 with a thickness of 1.2 mm and SCGA590DU-45 with a thickness of 1.2 mm were stacked one upon another in this order from an irradiation side of the welding laser beam. To form a substantially circular welding portion with a diameter of approximately 4.5 mm, the welding laser beam was irradiated to the work along a substantially circular welding trajectory. Next, the inspection laser beam (2,000 W in output, 83.93 m/min in scanning speed) was irradiated by 3.5 turns along the scanning trajectory having a substantially circular shape (around the welding center) with a radius of approximately 1.9 mm to pass the molten pool formed in the work. That is, the scanning cycle of the inspection laser beam was approximately 8.53 ms and its scanning frequency was approximately 117 Hz. Then, return light including reflected light from the molten pool in the work by the inspection laser beam, evaporation luminescence generated due to melting/evaporating of the work and thermal radiation light radiated from the molten pool of the work was received. The evaporation luminescence (approximately 550 nm in wavelength) and the thermal radiation light (approximately 800 nm in wavelength) were extracted from the received return light and the extracted evaporation luminescence and thermal radiation light were converted to electric signals to measure its signal intensity.

In the meantime, the dispersion in angle of the inspection laser beam in production line or the like was considered upon irradiation of the inspection laser beam to the molten pool formed in the works. That is, with the optical axis of the inspection laser beam 10° from a perpendicular line of the work surface to deviate the focus point of the inspection laser beam approximately ±1 mm from the work surface, the inspection laser beam was irradiated.

Figure 9:
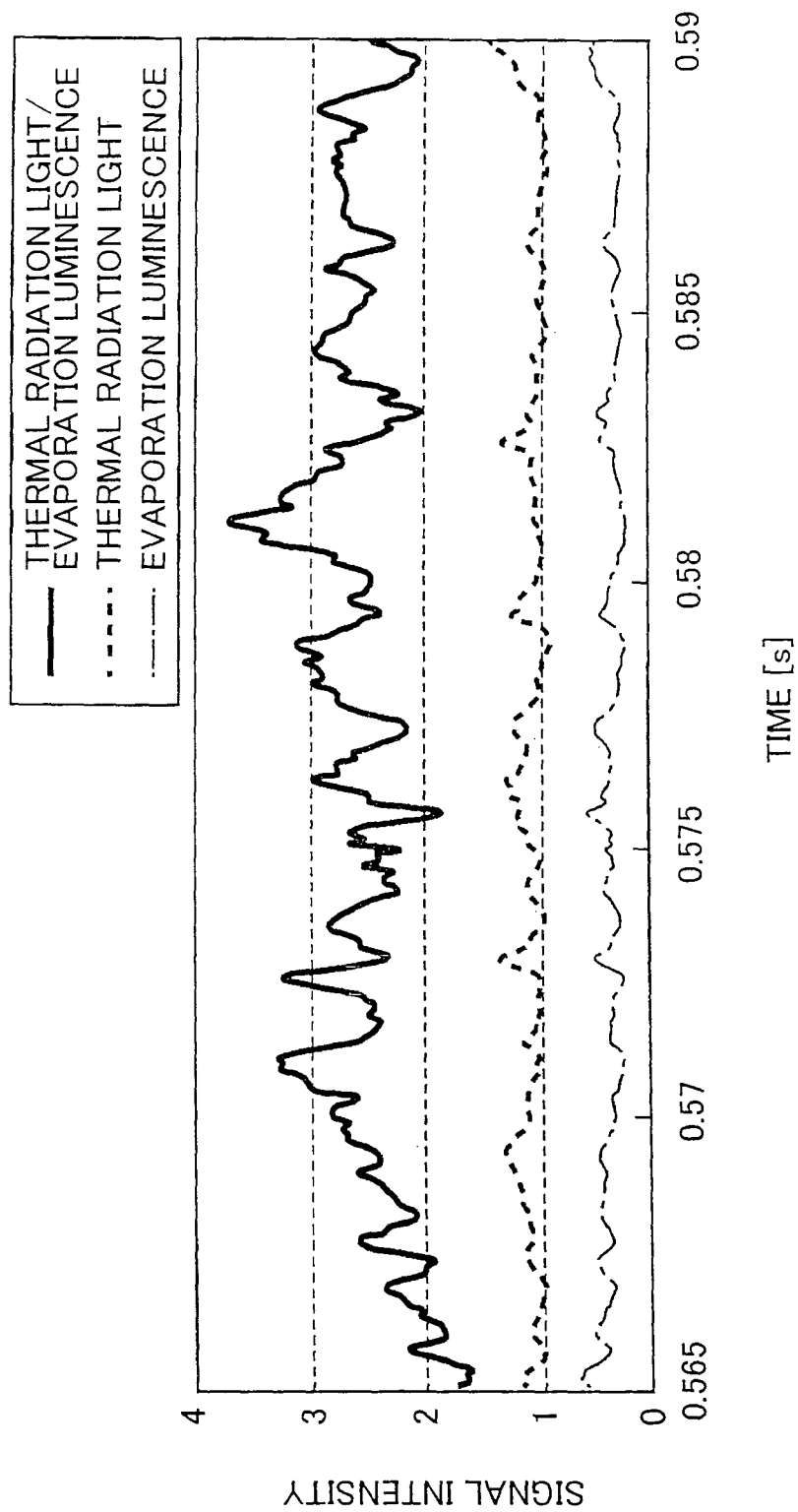
FIG. 9 is a diagram showing a measurement result of the intensities of the evaporation luminescence and thermal radiation light and an arithmetic processing result of a ratio of the intensity of thermal radiation light with respect to the intensity of evaporation luminescence according to an example 1 based on an inspection sample in time series.
Figure 10:
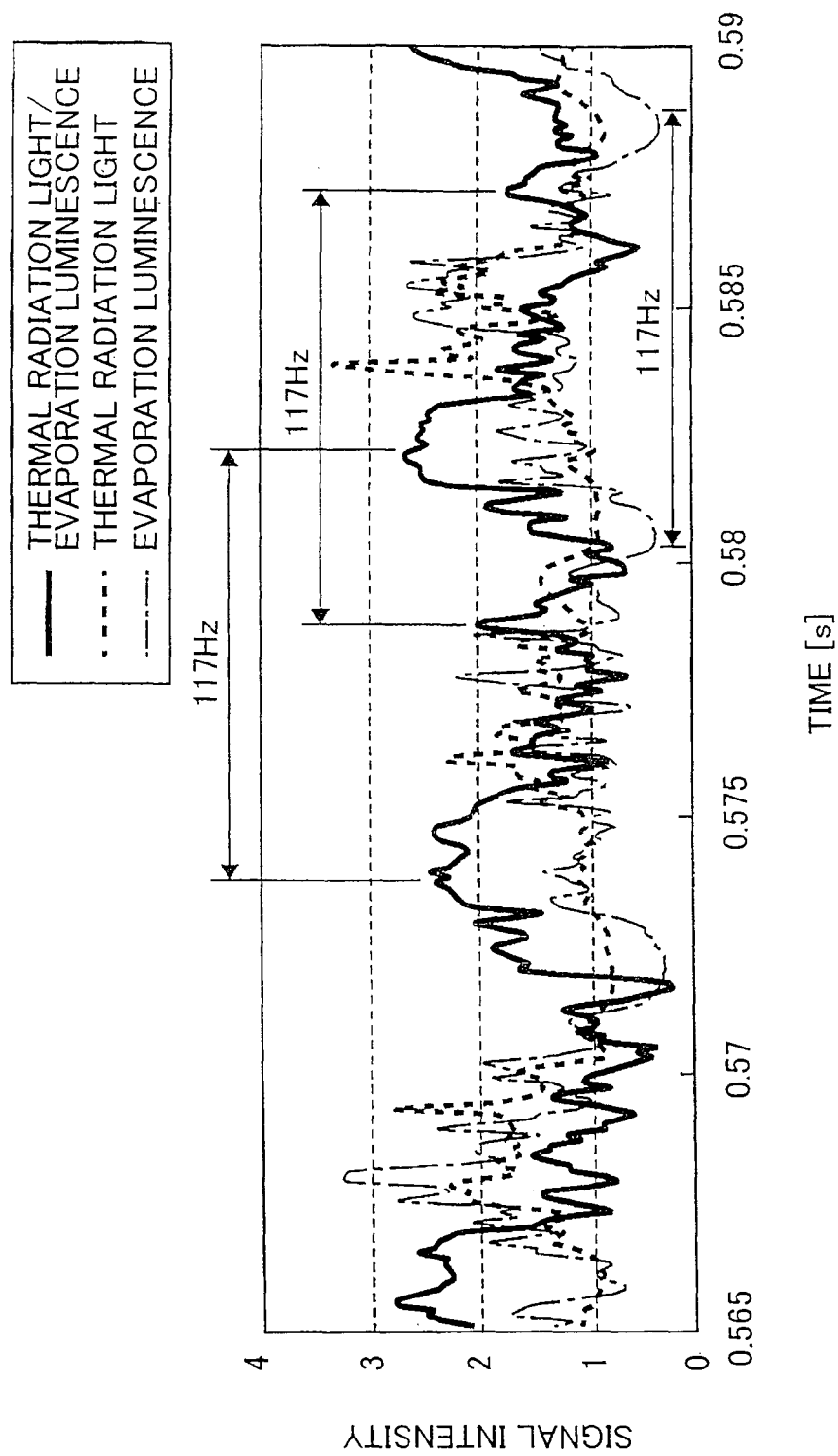
FIG. 10 is a diagram showing a measurement result of the intensities of the evaporation luminescence and thermal radiation light and an arithmetic processing result of a ratio of the intensity of thermal radiation light with respect to the intensity of evaporation luminescence according to an example 2 based on an inspection sample in time series.

Result of Evaluation on the Relationship Between the Ratio of the Intensity of Thermal Radiation Light with Respect to the Intensity of Evaporation Luminescence Based on Inspection Sample and Welding Condition of Welding Portion FIGS. 9 and 10 are diagrams showing measurement results of the intensities of evaporation luminescence and thermal radiation light according to the examples 1, 2 based on the inspection samples and an arithmetic result of the ratio of the intensity of thermal radiation light with respect to the intensity of evaporation luminescence, in time series. In the meantime, the inspection sample of example 1 is an inspection sample in which the welding condition of the welding portion is normal (see FIGS. 5A, 5B) and the inspection sample of example 2 is an inspection sample in which the welding condition of the welding portion is defective (for example, in the case of one side work depressed welding which is caused when welding bead on a work on the welding laser beam irradiation side is depressed, see FIGS. 7A, 7B).

In the inspection sample of example 1 (in which the welding condition is normal) as shown in FIG. 9, the intensity of evaporation luminescence and the intensity of thermal radiation light were substantially constant and no periodic change thereof was recognized. Further, although the ratio of the intensity of thermal radiation light with respect to the intensity of evaporation luminescence changed slightly, no periodic change thereof was recognized.

On the other hand, in the inspection sample of example 2 (boring generated because a work on the welding laser beam irradiation side of three works is fused and dropped) as shown in FIG. 10, a periodic change by approximately every 8.53 ms (approximately 117 Hz in frequency) equal to the scanning cycle of the inspection laser beam was recognized in the intensity of evaporation luminescence and the intensity of thermal radiation light. In addition, it was recognized that two waveforms containing a periodic change by approximately every 8.53 ms (approximately 117 Hz in frequency) were superposed one upon another such that their phases were shifted in the ratio of the intensity of thermal radiation light with respect to the intensity of evaporation luminescence.

Figure 11:
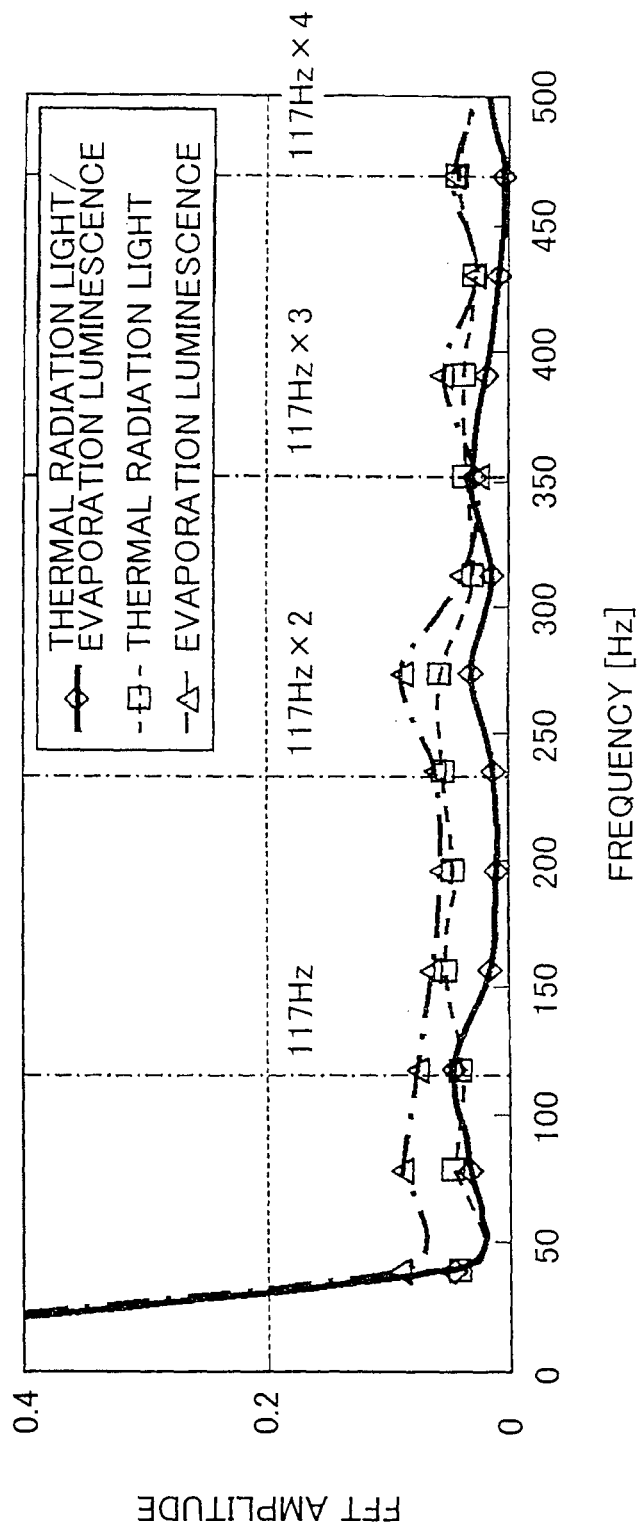
FIG. 11 is a diagram showing a relationship between the frequency and the amplitude concerning the intensity of evaporation luminescence, the intensity of thermal radiation light and a ratio of the intensity of thermal radiation light with the intensity of evaporation luminescence according to the example 1 based on an inspection sample.
Figure 12:
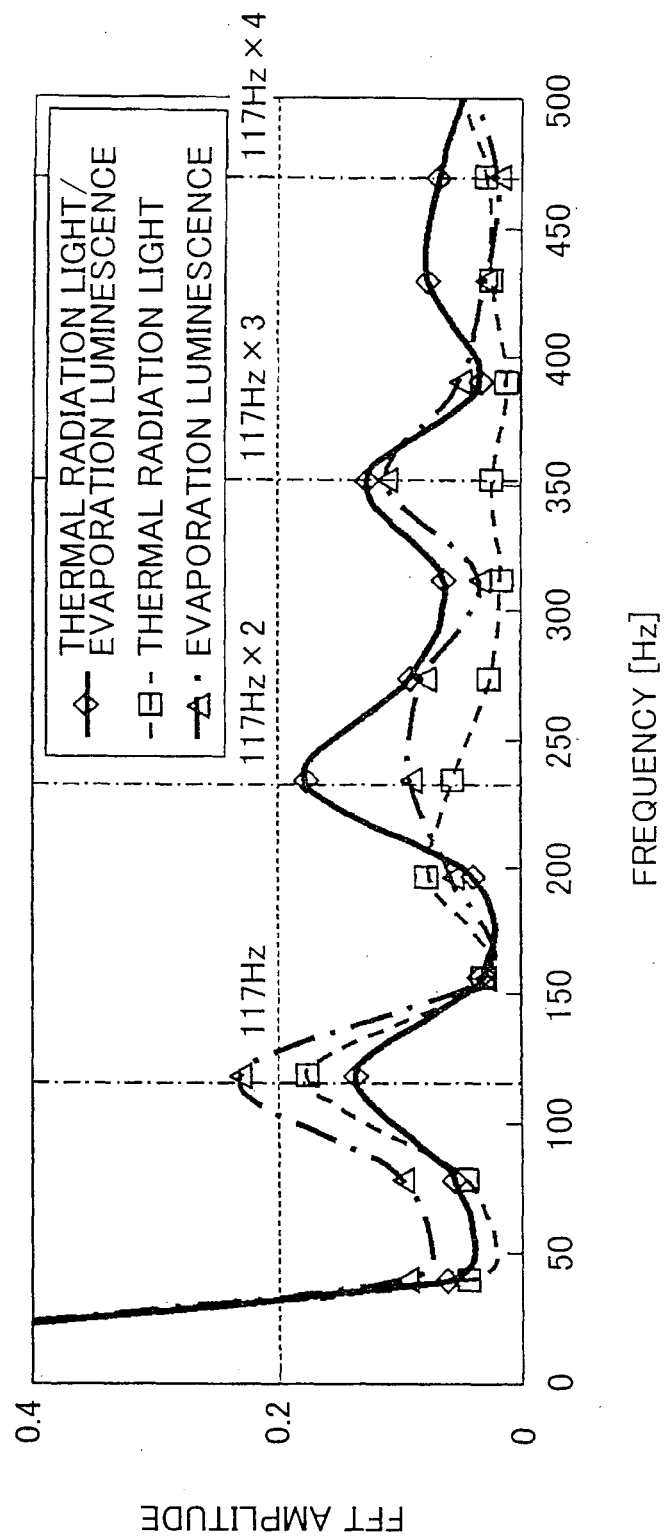
FIG. 12 is a diagram showing a relationship between the frequency and the amplitude concerning the intensity of evaporation luminescence, the intensity of thermal radiation light and a ratio of the intensity of thermal radiation light with the intensity of evaporation luminescence according to the example 2 based on an inspection sample.

FIGS. 11, 12 are diagrams showing a relationship between the frequency and the amplitude when fast Fourier transform was conducted on the intensity of evaporation luminescence, the intensity of thermal radiation light and the ratio of the intensity of thermal radiation light with respect to the intensity of evaporation luminescence in examples 1, 2 based on the inspection samples. The amplitude in FIGS. 11, 12 was nondimensionalized (or standardized) with the amplitude of the case in which the frequency was 0 Hz set to 1.

In case of the inspection sample (welding condition is normal) of example 1 as shown in FIG. 11, even if fast Fourier transform was conducted on the intensity of evaporation luminescence, the intensity of thermal radiation light and the ratio of the intensity of thermal radiation light with respect to the intensity of evaporation luminescence, no evident amplitude peak was recognized in a particular frequency.

On the other hand, in case of the inspection sample (with boring) of example 2 as shown in FIG. 12, even if fast Fourier transform was conducted on the intensity of evaporation luminescence, the intensity of thermal radiation light and the ratio of the intensity of thermal radiation light with respect to the intensity of evaporation luminescence, an evident amplitude peak was recognized in a frequency (hereinafter referred to as "fundamental frequency") of approximately 117 Hz equal to the scanning frequency of the inspection laser beam. However, if fast Fourier transform was conducted on the intensity of evaporation luminescence and the intensity of thermal radiation light, particularly if fast Fourier transform was conducted on the intensity of thermal radiation light, the amplitude peak became ambiguous under a frequency that is plural times as high as the fundamental frequency. To the contrary, if fast Fourier transform was conducted on the ratio of the intensity of thermal radiation light with respect to the intensity of evaporation luminescence, as described with reference to FIG. 10, an evident amplitude peak was recognized under a frequency that is plural times (e.g., twice or three times) as high as the fundamental frequency, because the ratio of the intensity of thermal radiation light with respect to the intensity of evaporation luminescence was amplified with a periodic change. In the meantime, the reason why the amplitude peak became ambiguous under the frequency that is plural times as high as the fundamental frequency when fast Fourier transform was conducted on the intensity of evaporation luminescence and the intensity of thermal radiation light can be considered to be that the inspection laser beam was irradiated obliquely to a work surface so that the focus point of the inspection laser beam deviated from the work surface.

Figure 13A:
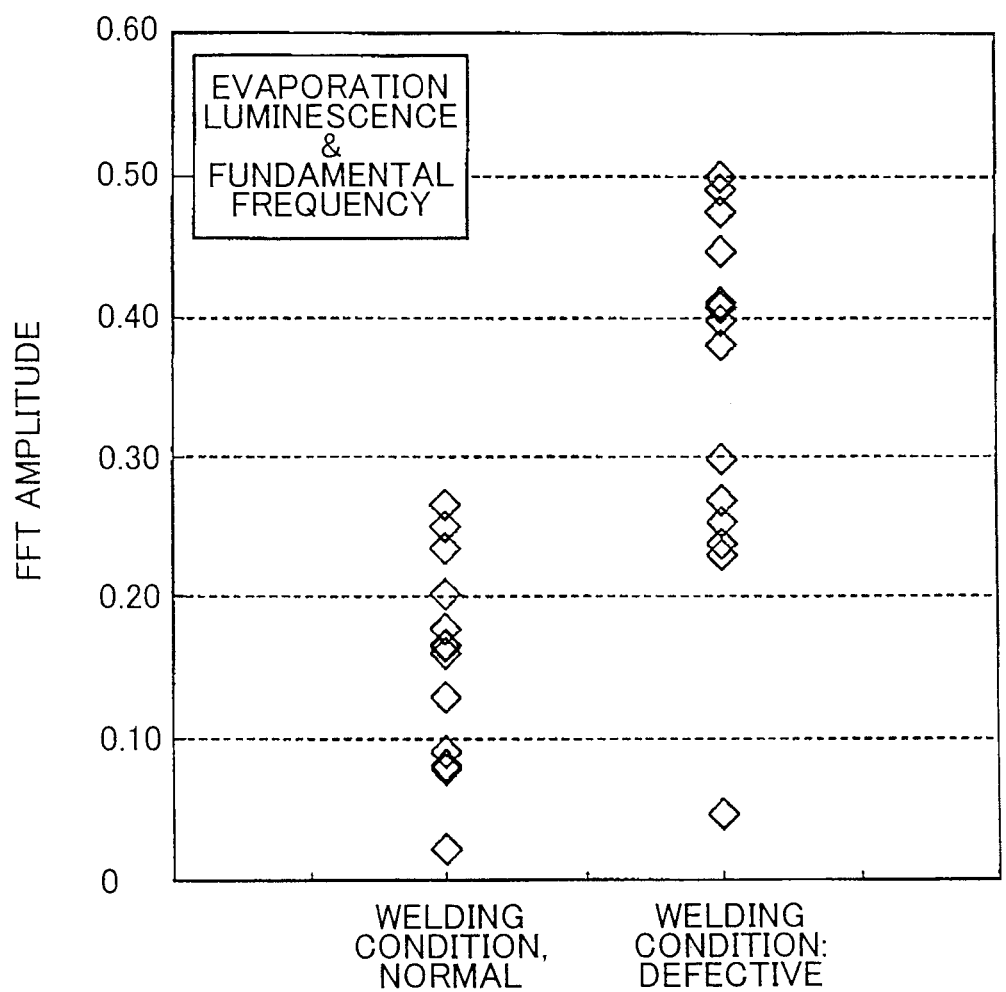
FIG. 13A is a diagram showing the amplitude under the fundamental frequency of the intensity of evaporation luminescence based on the inspection sample.
Figure 13B:
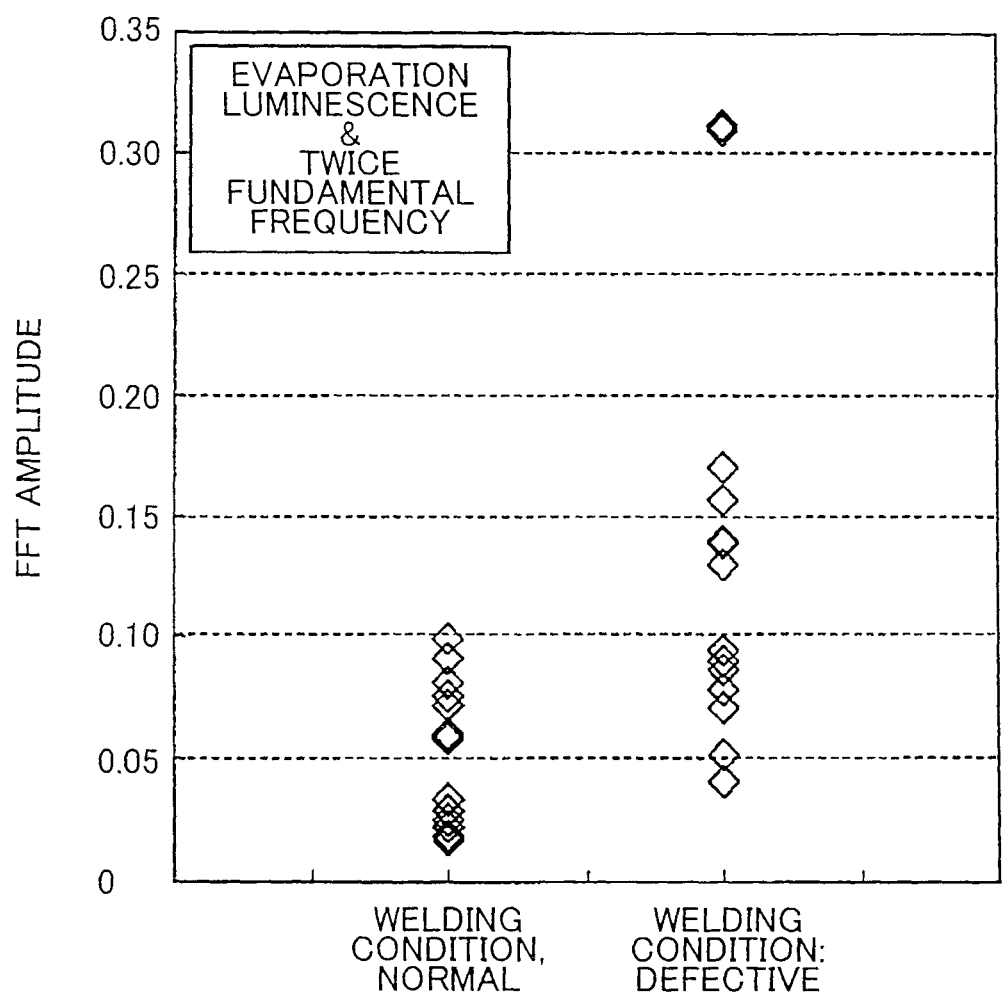
FIG. 13B is a diagram showing the amplitude under a frequency twice the fundamental frequency of the intensity of evaporation luminescence based on the inspection sample.
Figure 14A:
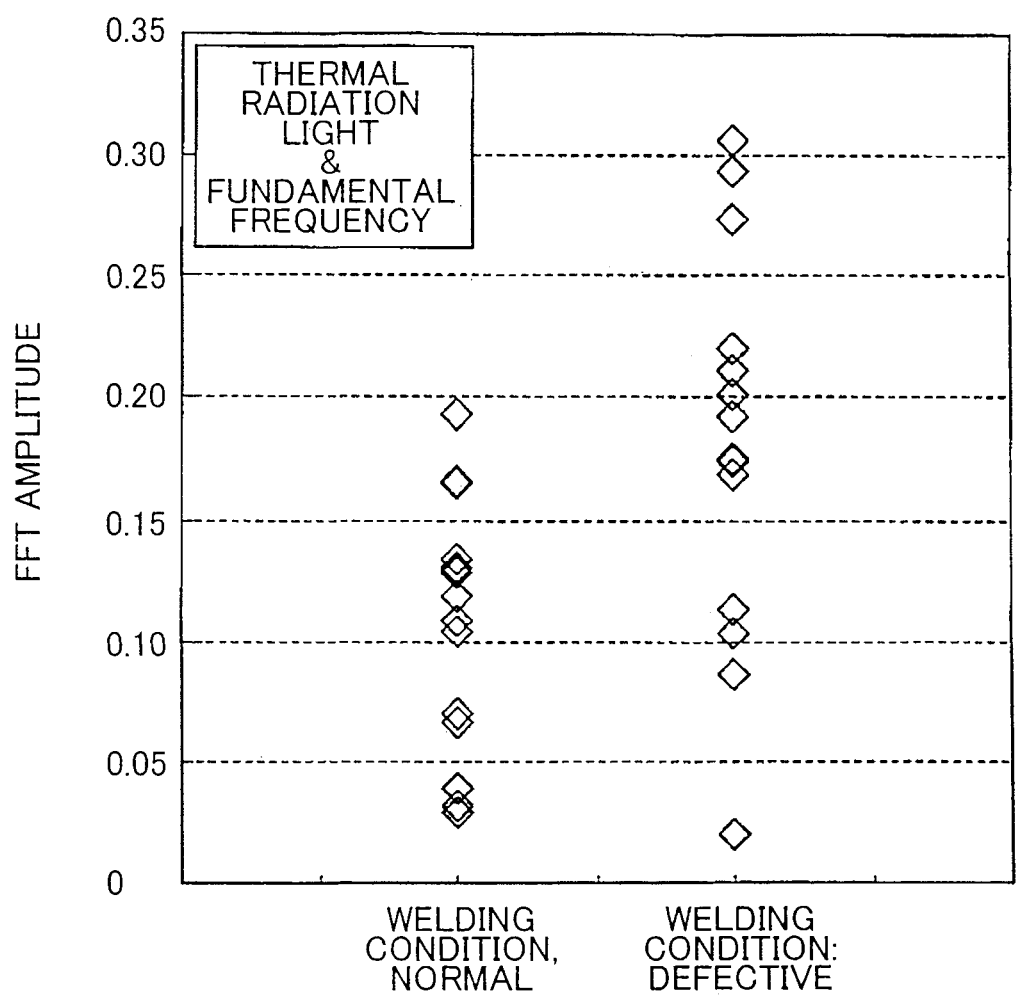
FIG. 14A is a diagram showing the amplitude under the fundamental frequency of the intensity of thermal radiation light based on the inspection sample.
Figure 14B:
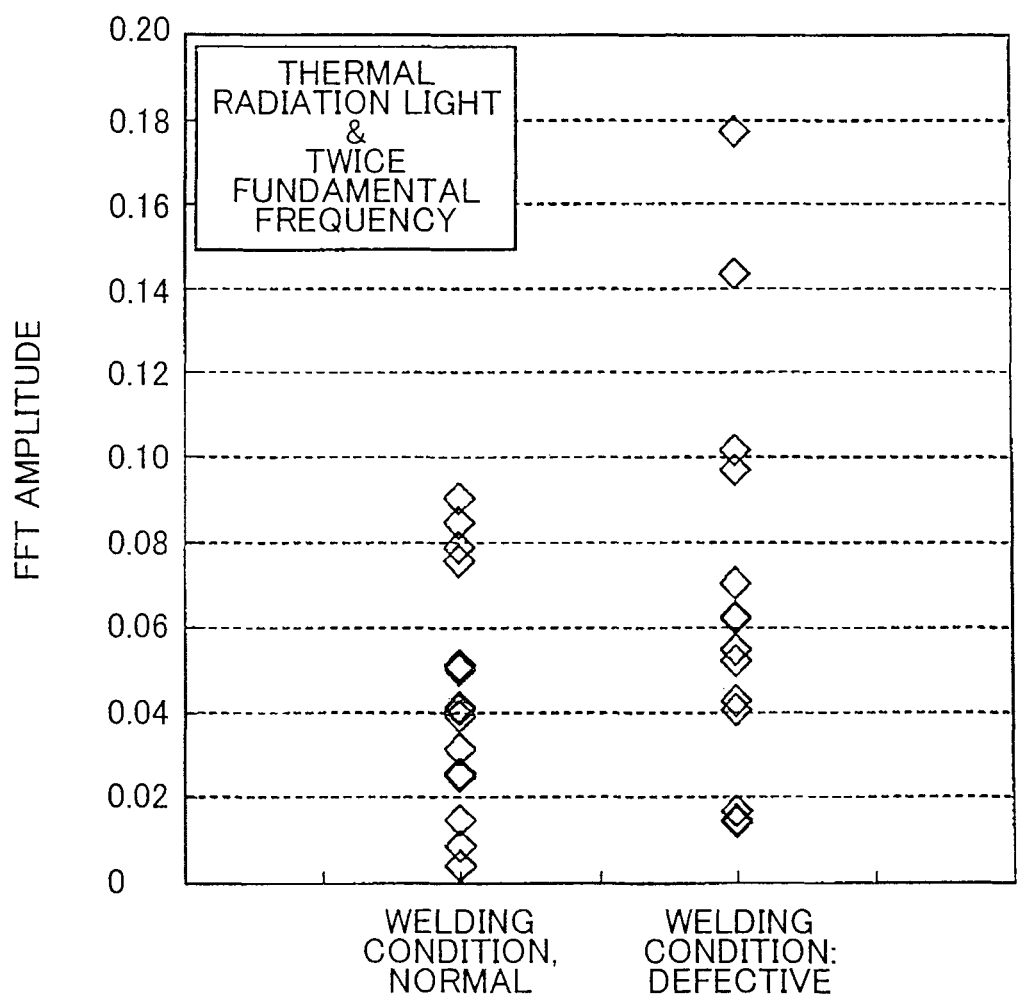
FIG. 14B is a diagram showing the amplitude under a frequency twice the fundamental frequency of the intensity of thermal radiation light based on the inspection sample.
Figure 15A:
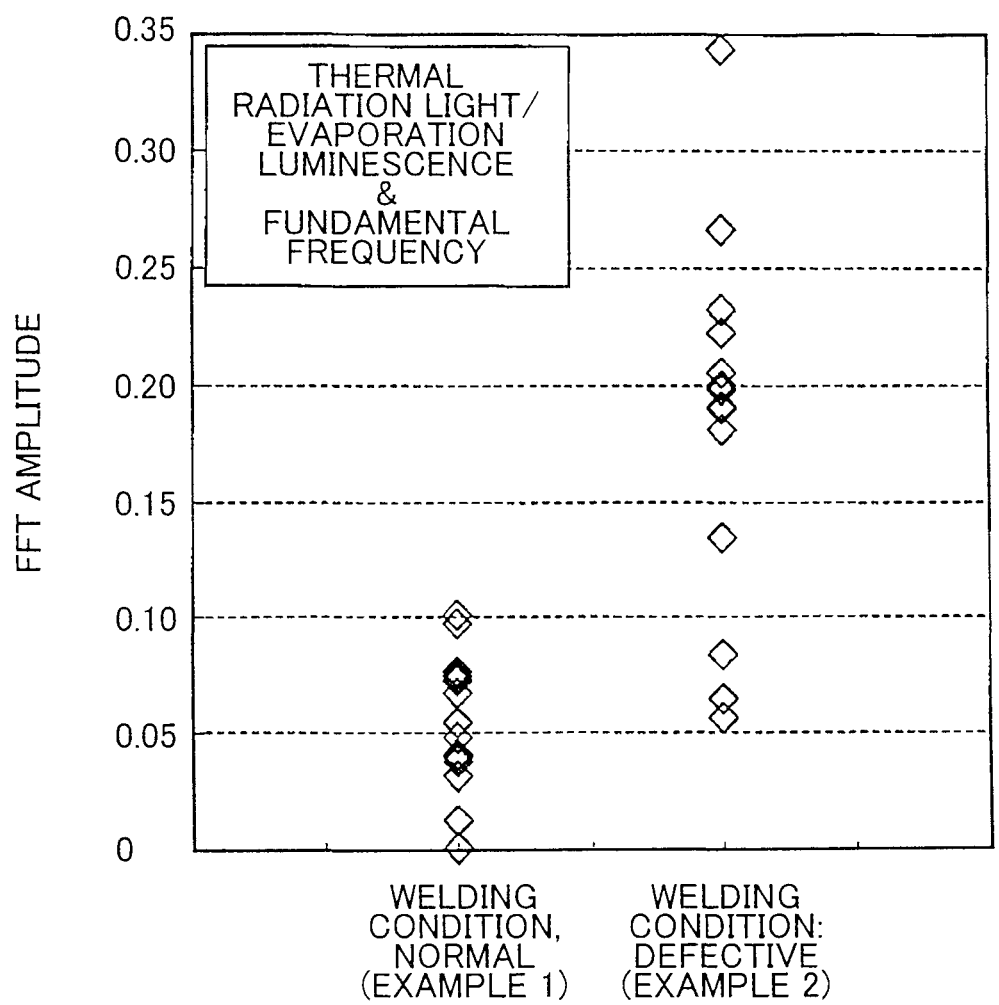
FIG. 15A is a diagram showing the amplitude under the fundamental frequency of the ratio of the intensity of thermal radiation light with respect to the intensity of evaporation luminescence based on an inspection sample.
Figure 15B:
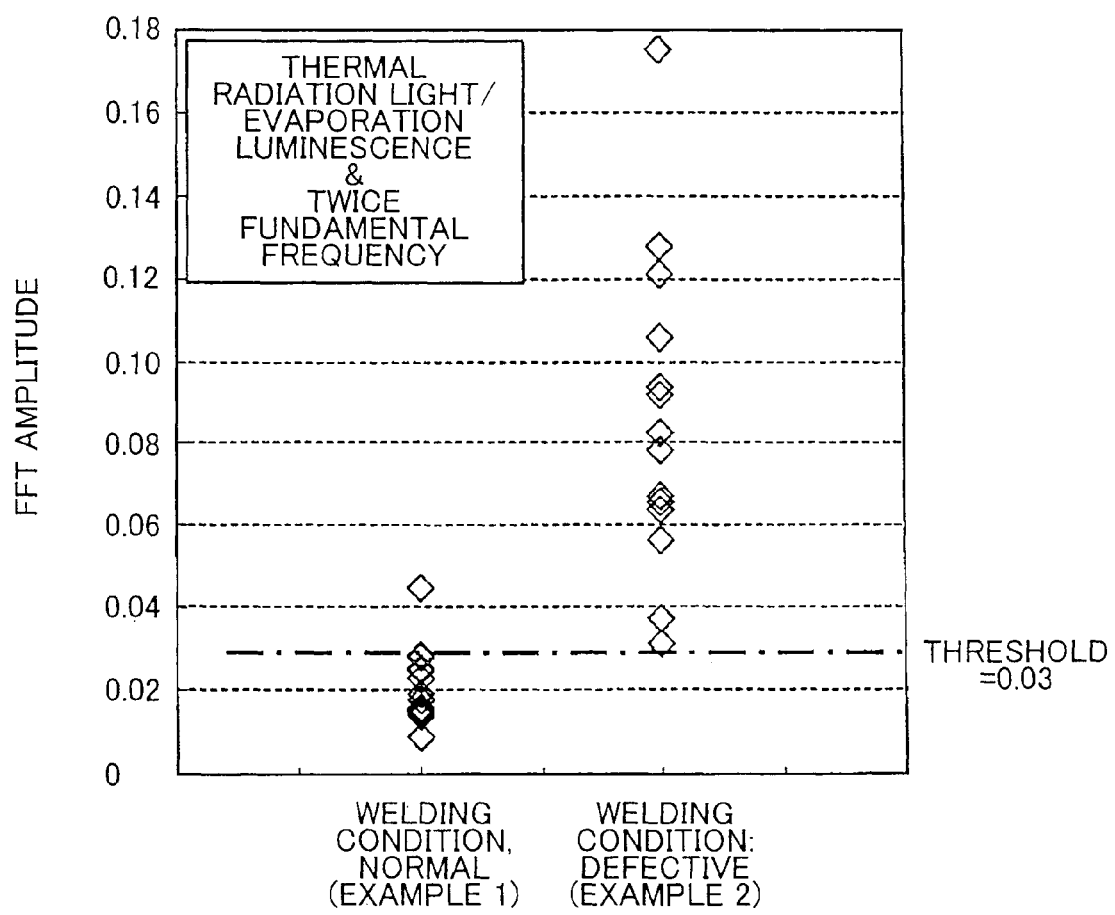
FIG. 15B is a diagram showing the amplitude under a frequency twice the fundamental frequency of the ratio of the intensity of thermal radiation light with respect to the intensity of evaporation luminescence based on an inspection sample.

FIG. 13A is a diagram showing the amplitude under the fundamental frequency of the intensity of evaporation luminescence based on the inspection sample. FIG. 13B is a diagram showing the amplitude under a frequency that is twice as high as the fundamental frequency. FIG. 14A is a diagram showing the amplitude under the fundamental frequency of the intensity of thermal radiation light based on the inspection sample. FIG. 14B is a diagram showing the amplitude under a frequency that is twice as high as the fundamental frequency. FIG. 15A is a diagram showing the amplitude under the fundamental frequency of the ratio of the intensity of thermal radiation light with respect to the intensity of evaporation luminescence based on an inspection sample. FIG. 15B is a diagram showing the amplitude under a frequency that is twice as high as the fundamental frequency.

In FIGS. 13A to 15B, 15 inspection samples were prepared for each of examples 1, 2. Based on respective inspection samples, fast Fourier transform was conducted on the intensity of evaporation luminescence, the intensity of thermal radiation light and the ratio of the intensity of thermal radiation thermal with respect to the intensity of evaporation luminescence. FIG. 13A to FIG. 15B show an amplitude under the fundamental frequency or a frequency that is twice as high as the fundamental frequency. The amplitudes in FIG. 13A to FIG. 15B are nondimensionalized with the amplitude of the case in which the frequency is 0 Hz set to 1.

If fast Fourier transform is conducted on the intensity of evaporation luminescence as shown in FIGS. 13A, 13B, the amplitude under the fundamental frequency or a frequency that is twice as high as the fundamental frequency based on the inspection sample (with boring) of the example 2 is larger on average than the amplitude under the fundamental frequency or a frequency that is twice as high as the fundamental frequency based on the inspection sample (in which the welding condition is normal) of example 1. However, part of the inspection samples (in which the welding condition is normal) of example 1 and part of the inspection sample (with boring) of example 2 have an equal amplitude. Thus, it is impossible to set a threshold for discriminating the inspection sample (in which the welding condition is normal) of example 1 from the inspection sample (with boring) of example 2. In production line and the like, for example, the welding condition of the welding portion formed in a work cannot be determined precisely.

Further, when fast Fourier transform was conducted on the intensity of thermal radiation light as shown in FIGS. 14A, 14B, the amplitude under the fundamental frequency or a frequency that is twice as high as the fundamental frequency based on the inspection sample (with boring) of example 2 is larger on an average than the amplitude under the fundamental frequency or a frequency that is twice as high as the fundamental frequency based on the inspection sample (in which the welding condition is normal) of example 1. However, for example, as when fast Fourier transform is conducted on the intensity of evaporation luminescence, no threshold can be set to discriminate the inspection sample (in which the welding condition is normal) of example 1 from the inspection sample (with boring) of example 2. In production line and the like, for example, the welding condition of the welding portion formed in a work cannot be determined precisely.

On the other hand, when fast Fourier transform was conducted on the ratio of the intensity of thermal radiation light with respect to the intensity of evaporation luminescence as shown in FIGS. 15A, 15B, it was recognized that the amplitude under the fundamental frequency or a frequency that is twice as high as the fundamental frequency based on the inspection sample (with boring) of example 2 was relatively larger than the amplitude under the fundamental frequency or a frequency that is twice as high as the fundamental frequency based on the inspection sample (in which the welding condition is normal) of example 1, in most parts of the inspection sample of example 2. Particularly, as shown in FIG. 15B, the amplitude under a frequency that is twice as high as the fundamental frequency based on the inspection sample of example 2 is relatively larger than the amplitude under the fundamental frequency or a frequency that is twice as high as the fundamental frequency based on the inspection sample of example 1. Thus, by setting a predetermined threshold (e.g., 0.03) with respect to the amplitude, it is possible to discriminate the inspection sample (in which the welding condition is normal) of example 1 from the inspection sample (with boring) of example 2 precisely. In production line and the like, for example, it was recognized that the welding condition of the welding portion formed in a work could be determined easily and accurately.

In the meantime, from the relationship between the frequency and the amplitude shown in FIG. 12, it is considered that the amplitude under a frequency that is plural times as high as the fundamental frequency based on the inspection sample (with boring) of example 2 is relatively larger than the amplitude under a frequency that is plural times as high as the fundamental frequency based on the inspection sample (in which the welding condition is normal) of example 1. Thus, based on the amplitude under a frequency that is plural times as high as the fundamental frequency, it is considered that the inspection sample (in which the welding condition is normal) of example 1 can be discriminated from the inspection sample (with boring) of example 2 precisely.

From this experimental result, it has been verified that according to the simple method of calculating the ratio of the intensity of thermal radiation light with respect to the intensity of evaporation luminescence and conducting fast Fourier transform on the ratio, even if the angle of optical axis of laser beam deviates from a work surface in production line and the like, for example or if an electric signal obtained from the return light after irradiating laser beam obliquely to the work weakens or if the intensity of the return light changes depending on a change in work temperature (for example, a change in work temperature due to a rise in work temperature upon welding or a change in outdoor temperature), the welding condition of the welding portion including the welding defect such as boring or one side work depressed welding can be inspected precisely.

Although the embodiments of the present invention have been described in detail with reference to the drawings above, the specific configuration of the present invention is not restricted to these embodiments, but it is needless to say that any modifications and the like in a range not departing from the spirit of the present invention are included in the present invention.

The invention claimed is:

1. A welding portion inspection device configured to inspect a welding condition of a welding portion formed when a plurality of works are welded together, the welding portion inspection device comprising:
   a laser beam irradiation portion configured to irradiate a welding laser beam along a welding trajectory set in works plural times or irradiate an inspection laser beam plural times along a scanning trajectory set in a molten pool of the work melted by the welding laser beam so as to weld together the works;
   a laser-receiving sensor configured to receive return light including reflected light from the molten pool in the work by the welding laser beam or the inspection laser beam irradiated by the laser beam irradiation portion, evaporation luminescence which is generated by evaporating of the work and thermal radiation light radiated from the molten pool in the work;
   an optical filter configured to extract a first component containing evaporation luminescence and a second component containing thermal radiation light from return light received by the laser-receiving sensor; and
   a measuring instrument configured to inspect the welding condition of the welding portion of the work based on a ratio between intensities of the first component and the second component which are extracted by the optical filter wherein
   the measuring instrument inspects the welding condition of the welding portion of the work by conducting Fourier transform on a ratio between the intensity of the first component and the intensity of the second component or a power of the ratio between the intensity of the first component and the intensity of the second component.

2. The welding portion inspection device according to claim 1, wherein
   the measuring instrument inspects the welding condition of the welding portion of the work based on an amplitude under a frequency that is plural times as high as a fundamental frequency which is detected by conducting Fourier transform on a ratio between the intensity of the first component and the intensity of the second component or the power of the ratio between the intensity of the first component and the intensity of the second component.

3. The welding portion inspection device according to claim 1, wherein
   the optical filter spectrally disperses the return light received by the laser-receiving sensor to at least the first component containing evaporation luminescence and the second component containing thermal radiation light and extracts the first component containing evaporation luminescence and the second component containing thermal radiation light from the return light.

4. A welding portion inspection method adapted to inspect a welding condition of a welding portion formed when a plurality of works are welded together, the welding portion inspection method comprising:
   irradiating welding laser beam along a welding trajectory set in works plural times or irradiating inspection laser beam along a scanning trajectory set in a molten pool of the work melted by the welding laser beam plural times so as to weld together the works;

receiving return light including reflected light from the molten pool in the work by the welding laser beam or the inspection laser beam, evaporation luminescence which is generated by evaporating of the work and thermal radiation light radiated from the molten pool in the work;

extracting a first component containing evaporation luminescence and a second component containing thermal radiation light from return light; and inspecting the welding condition of the welding portion of the work based on a ratio between an intensity of the first component and an intensity of the second component, wherein in the inspecting, the welding condition of the welding portion of the work is inspected by conducting Fourier transform on a ratio between the intensity of the first component and the intensity of the second component or a power of the ratio between the intensity of the first component and the intensity of the second component.

5. The welding portion inspection method according to claim 4, wherein in the inspecting, the welding condition of the welding portion of the work is inspected based on an amplitude under a frequency that is plural times as high as a fundamental frequency which is detected by conducting Fourier transform on a ratio between the intensity of the first component and the intensity of the second component or the power of the ratio between the intensity of the first component and the intensity of the second component.

6. The welding portion inspection method according to claim 4, wherein in the extracting, the first component containing evaporation luminescence and the second component containing thermal radiation light are extracted from the return light by spectrally dispersing the return light to at least the first component containing evaporation luminescence and the second component containing thermal radiation light.

* * * * *